US012589535B2

(12) United States Patent
Stalcup et al.

(10) Patent No.: US 12,589,535 B2
(45) Date of Patent: **\*Mar. 31, 2026**

(54) MEDICAL IMPLANTS WITH VENT OPENINGS FOR MOLDING

(71) Applicant: SMed-TA/TD, LLC, Columbia City, IN (US)

(72) Inventors: Gregory C. Stalcup, Fort Wayne, IN (US); Kreigh R. Williams, Fort Wayne, IN (US)

(73) Assignee: SMed-TA/TD, LLC, Columbia City, IN (US)

( \* ) Notice: Subject to any disclaimer, the term of this patent is extended or adjusted under 35 U.S.C. 154(b) by 186 days.

This patent is subject to a terminal disclaimer.

(21) Appl. No.: 18/531,263

(22) Filed: Dec. 6, 2023

(65) Prior Publication Data

US 2024/0100751 A1      Mar. 28, 2024

Related U.S. Application Data

(63) Continuation of application No. 17/307,549, filed on May 4, 2021, now Pat. No. 11,872,733.

(60) Provisional application No. 63/020,136, filed on May 5, 2020.

(51) Int. Cl.
  *B29C 45/26*        (2006.01)
  *B29C 45/14*        (2006.01)
  *B29L 31/00*        (2006.01)

(52) U.S. Cl.
  CPC ........ *B29C 45/14065* (2013.01); *B29C 45/26* (2013.01); *B29K 2995/0056* (2013.01); *B29L 2031/753* (2013.01)

(58) Field of Classification Search
  CPC .............. B29C 45/14065; B29C 45/26; B29K 2995/0056
  See application file for complete search history.

(56) References Cited

U.S. PATENT DOCUMENTS

2020/0289714 A1 \* 9/2020 Snell ...................... A61L 27/46

FOREIGN PATENT DOCUMENTS

EP        2042291 A1 \* 4/2009    ............. B29C 33/56

OTHER PUBLICATIONS

Gurmann, EP-2042291-A1 Machine Translation "Method for Producing a Molded Part", Clarivate Analytics, Apr. 1, 2009, entire document (Year: 2023).
Merriam-Webster, "Placing", Merriam-Webster, May 19, 2023, entire document (Year: 2023).

\* cited by examiner

*Primary Examiner* — JaMel M Nelson
(74) *Attorney, Agent, or Firm* — TAYLOR & EDELSTEIN, PC

(57)        ABSTRACT

A method of forming an implant includes: placing a porous scaffold having a plurality of pores formed therein in a mold part cavity of a mold cavity of a mold, the porous scaffold including two portions of biocompatible material and a barrier layer disposed between the two portions, the barrier layer including a solid sheet having a plurality of vent openings that are sized to allow gas to vent therethrough; and injecting molding material into the mold cavity to fill the mold cavity and form the implant, wherein at least some of the gas in the mold cavity vents through the vent openings during the injecting.

13 Claims, 18 Drawing Sheets

MEDICAL IMPLANTS WITH VENT OPENINGS FOR MOLDING

CROSS REFERENCE TO RELATED APPLICATIONS

This is a continuation of U.S. patent application Ser. No. 17/307,549, entitled "MEDICAL IMPLANTS WITH VENT OPENINGS FOR MOLDING," filed on May 4, 2021, which is incorporated herein by reference. U.S. patent application Ser. No. 17/307,549 is a non-provisional application based upon U.S. Provisional Patent Application Ser. No. 63/020, 136, entitled "MEDICAL IMPLANTS WITH VENT OPENINGS FOR MOLDING," filed May 5, 2020, which is incorporated herein by reference.

BACKGROUND OF THE INVENTION

1. Field of the Invention

The present disclosure relates to medical implants and, more particularly, to orthopaedic implants.

2. Description of the Related Art

Medical implants, such as orthopaedic implants, are costly to manufacture for a variety of reasons. One of the reasons that medical implants are costly to manufacture is due to the strict requirements of, for example, tolerances and sterility of the implants. Another reason that medical implants are costly to manufacture is that many implants incorporate pores, which are incorporated to encourage tissue ingrowth but tend to weaken the structure of the implant and must be kept open in order to allow tissue ingrowth. Yet another reason that medical implants are costly to manufacture is that many implants have unique and complex shapes, which makes machining materials into the shape of the final implant difficult.

What is needed in the art is a way to form medical implants that addresses at least some of the issues of known ways of forming medical implants.

SUMMARY OF THE INVENTION

Exemplary embodiments disclosed herein provide implants that include one or more vent openings that are configured to allow gas to escape during molding while allowing only minimal, if any, flow of molding material, such as polymer, through the opening(s).

The invention in one form is directed to a method of forming an implant, the method including: placing a scaffold having a plurality of pores formed therein in a mold part cavity of a mold cavity of a mold, the placed scaffold including at least one vent opening that accepts at least one mold insert post of the mold, the at least one vent opening and the at least one mold insert post forming a clearance therebetween; and injecting molding material into the mold cavity to fill the mold cavity and form the implant such that gas flows through the clearance without molding material flowing through the clearance during the injecting.

An advantage of the present invention is the clearance allows gas venting during the injecting, which can reduce the risk of bubbles undesirably forming in the formed implant and increase the cooling rate of the molding material.

Another advantage is the method can form the implant in a rapid manner, which can allow economical production of implants.

Yet another advantage is that the mold can be formed to have a large variety of shapes, allowing production of implants with a large variety of shapes.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
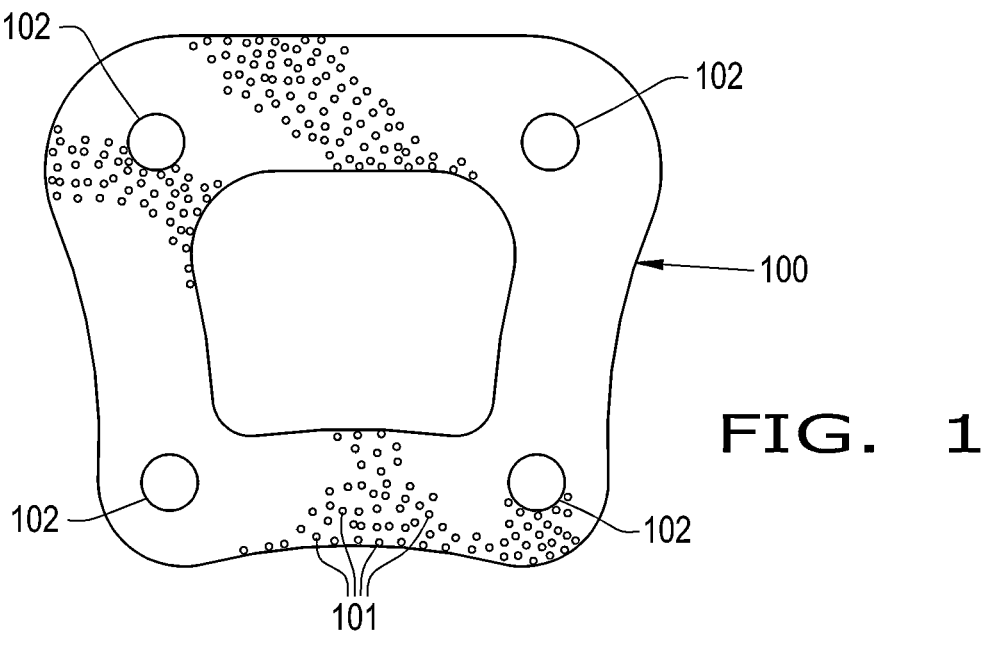
FIG. 1 is a top view of an exemplary embodiment of a scaffold provided according to the present invention for forming an implant.
Figure 3:
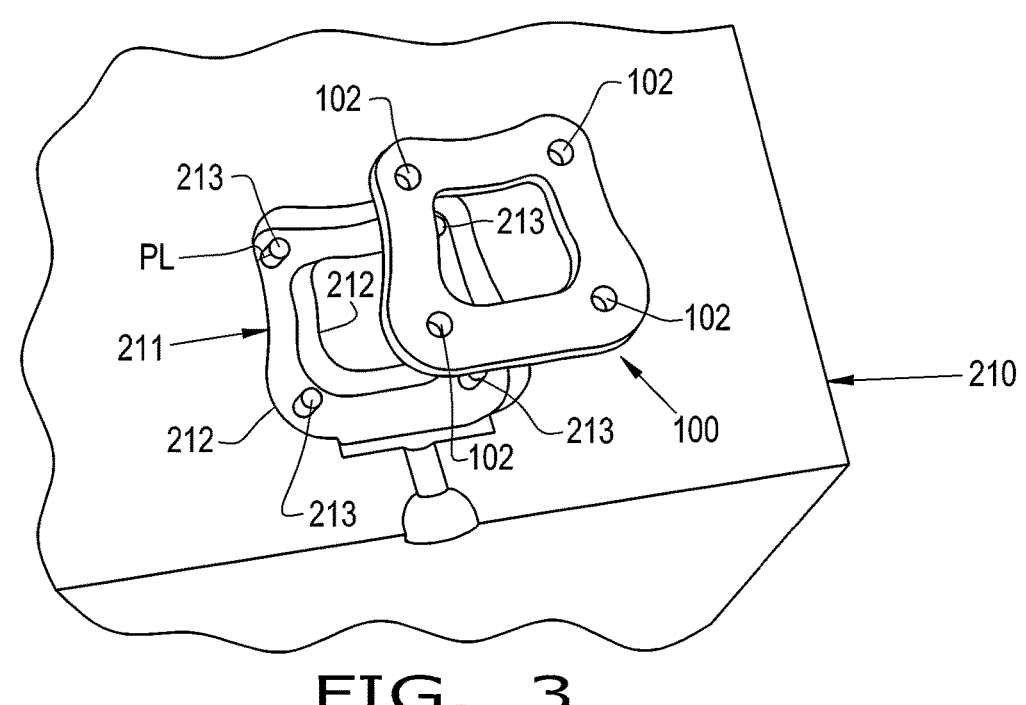
FIG. 3 is a perspective view of the scaffold of FIGS. 1-2 being placed in the mold part cavity of FIG. 2.
Figure 4:
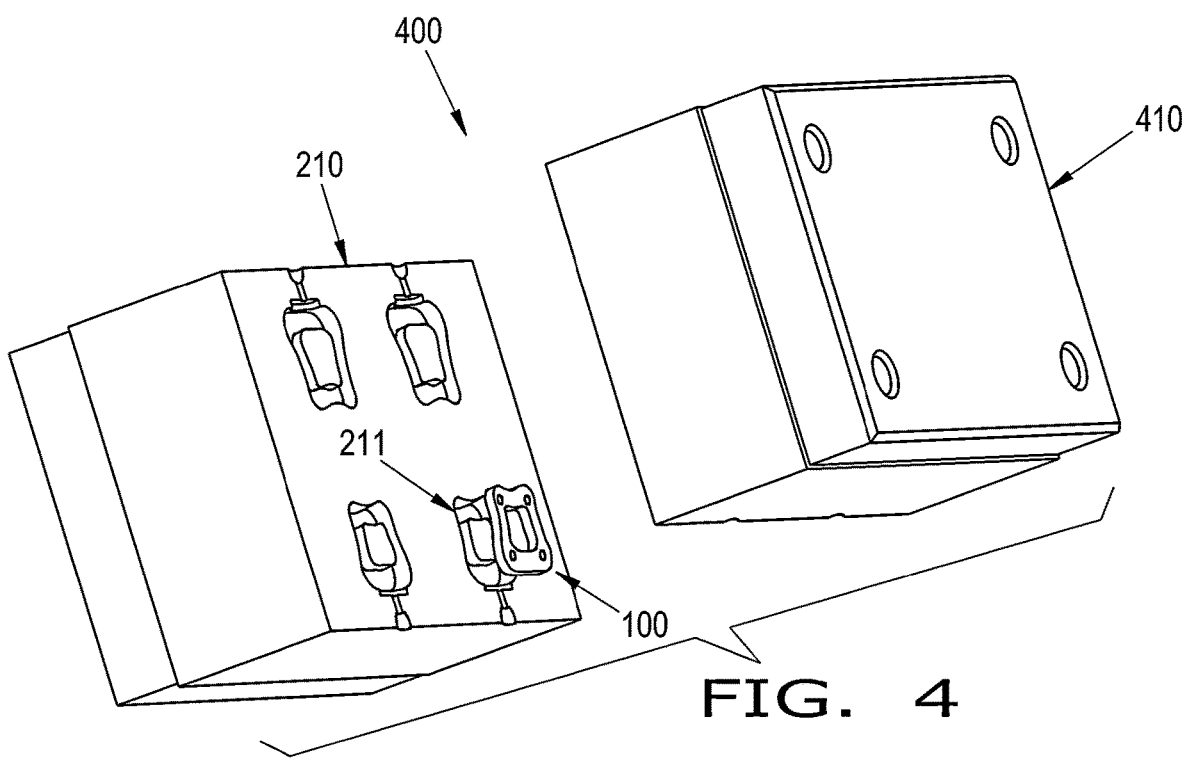
FIG. 4 is a perspective view of the scaffold of FIGS. 1-3 being placed in the mold part cavity while another mold part is being brought toward the mold part of FIGS. 2-3 to form a mold cavity.
Figure 5:
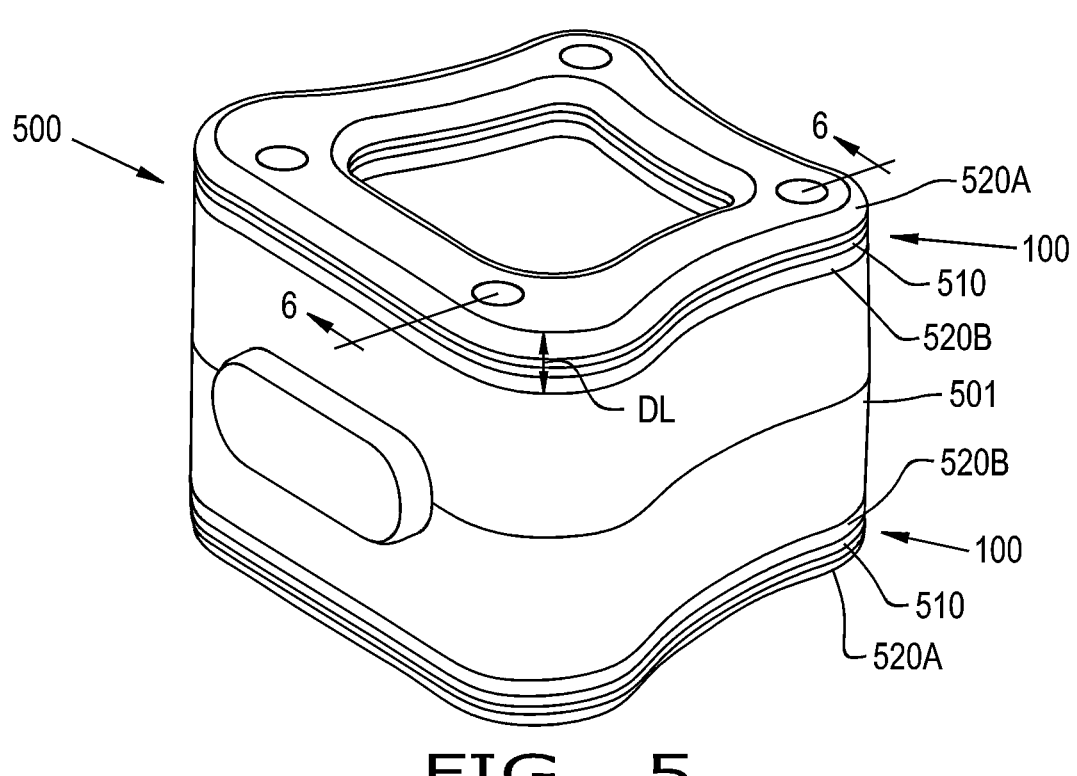
FIG. 5 is a perspective view of an exemplary embodiment of an orthopaedic implant provided according to the present invention that may be formed using the mold parts of FIG. 4.
Figure 6:
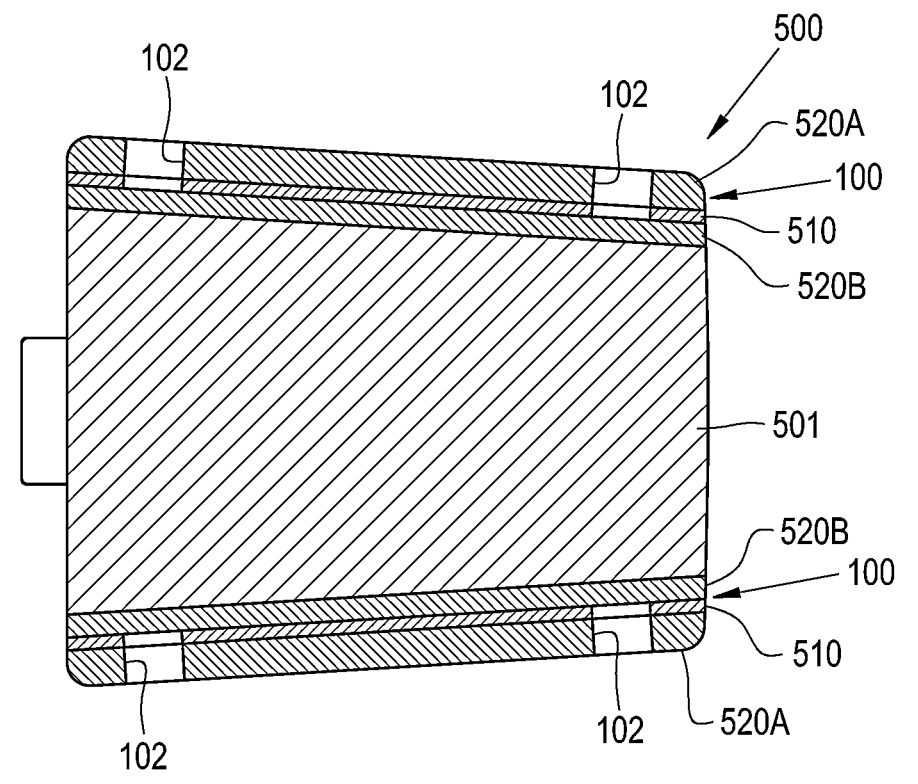
FIG. 6 is a cross-sectional view of the orthopaedic implant of FIG. 5 taken along line 6-6.
Figure 7:
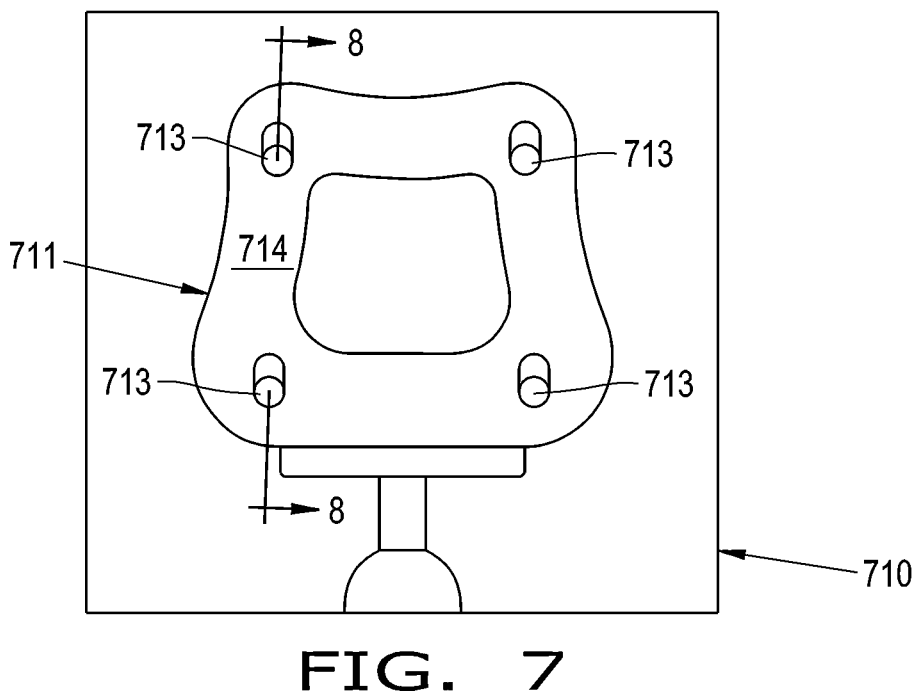
FIG. 7 is a top view of another exemplary embodiment of a mold part provided according to the present invention that includes an elongated mold insert post.
Figure 8:
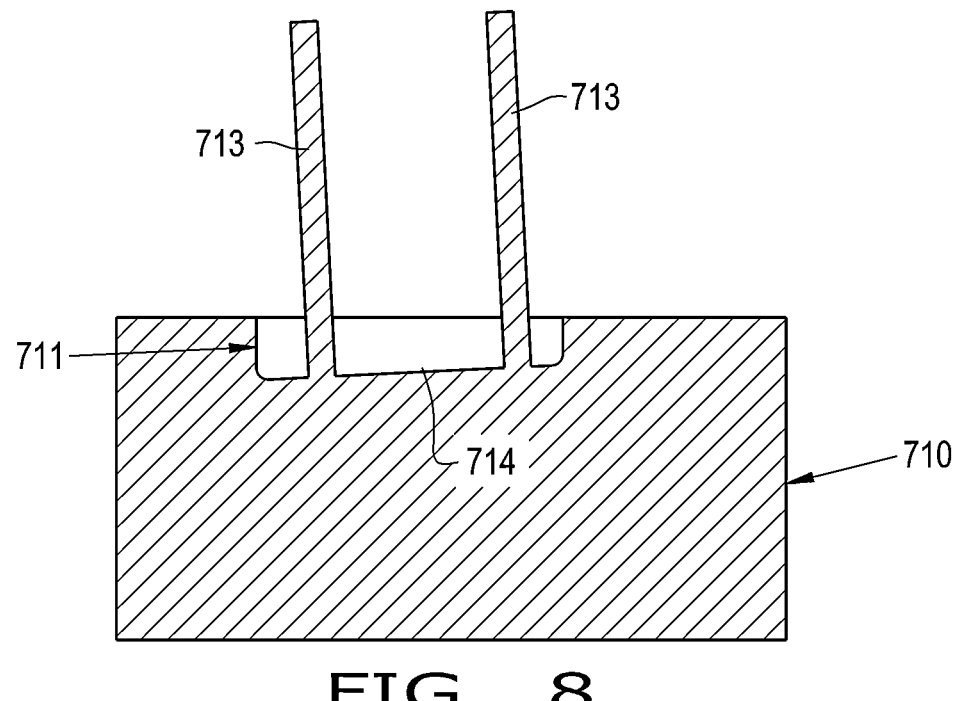
FIG. 8 is a cross-sectional view of the mold part of FIG. 7 taken along line 8-8.
Figure 9:
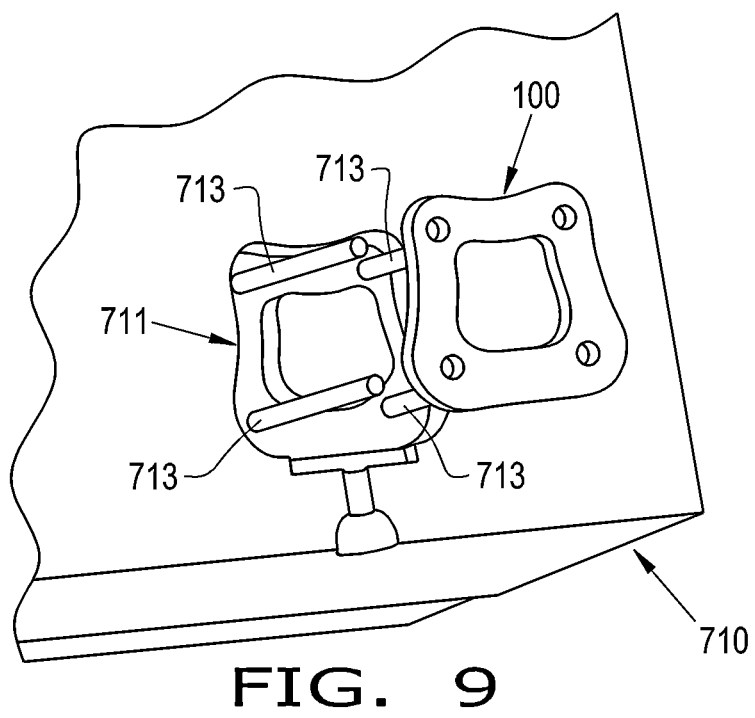
FIG. 9 is a perspective view of a scaffold being placed into a mold cavity of the mold part of FIGS. 7-8.
Figure 10:
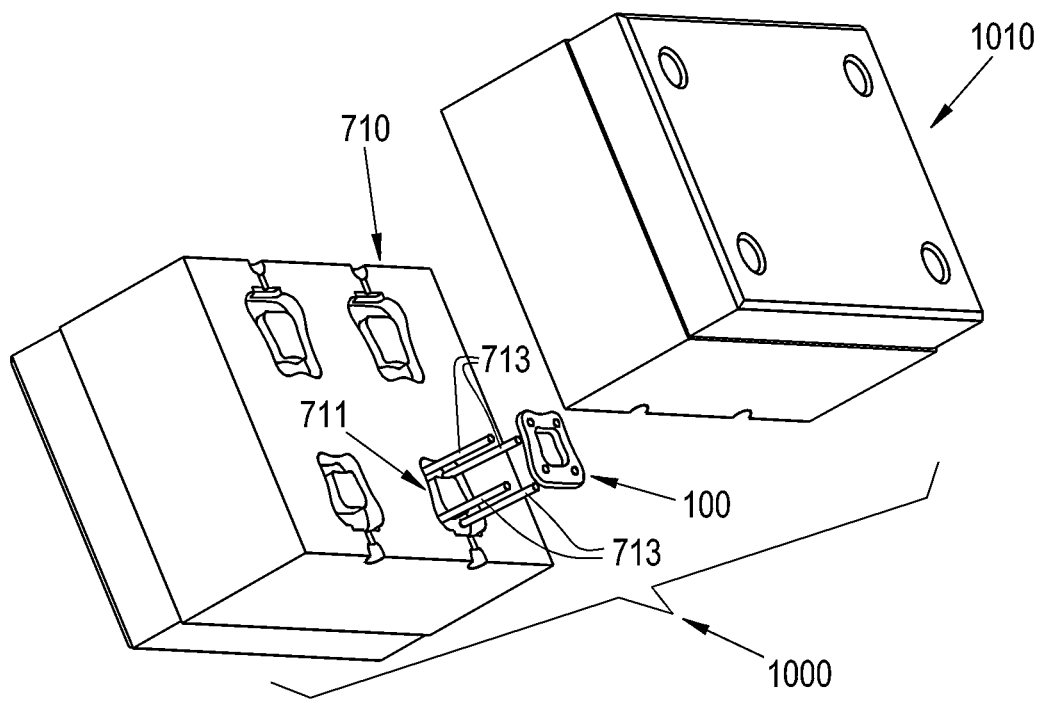
FIG. 10 is a perspective view of the scaffold being placed in the mold cavity of the mold part of FIGS. 7-9 and a second mold part being brought toward the mold part to form a mold cavity.

Referring now to the drawings, and more particularly to FIGS. 1-6, an exemplary method of forming an implant 500, which may be an orthopaedic implant and is illustrated in FIGS. 5-6, is illustrated. It should be appreciated that while an orthopaedic implant is illustrated in FIGS. 5-6 and described further herein, the method provided according to the present disclosure may be used to make medical implants that are not configured as orthopaedic implants. A scaffold 100, which may incorporate pores 101 and is illustrated in FIG. 1, is provided that comprises a biocompatible material. Exemplary biocompatible materials include, but are not limited to, polymers such as polyaryl ether ketones (PAEK), e.g., polyether ether ketone (PEEK) or polyether ketone ketone (PEKK), polycarbonate urethane (PCU), and ultra-high molecular weight polyethylene (UHMWPE) as well as metals such as titanium, stainless steel, and cobalt-chrome. The scaffold 100 may incorporate a plurality of pores 101 and have an overall porosity ranging from generally non-porous, i.e., less than 10% porosity, or porous, i.e., greater than 10% porosity. In some embodiments, the porosity of the scaffold 100 is at least 20%, such as 40% to 80%. Exemplary biocompatible materials that may be used to form the scaffold 100 are commercially sold under the tradename OSTEOSYNC® by SITES MEDI-CAL® of Columbia City, Indiana. It should be appreciated that a wide variety of biocompatible materials may be used to form the scaffold 100, and the previously described materials are exemplary only.

Figure 2:
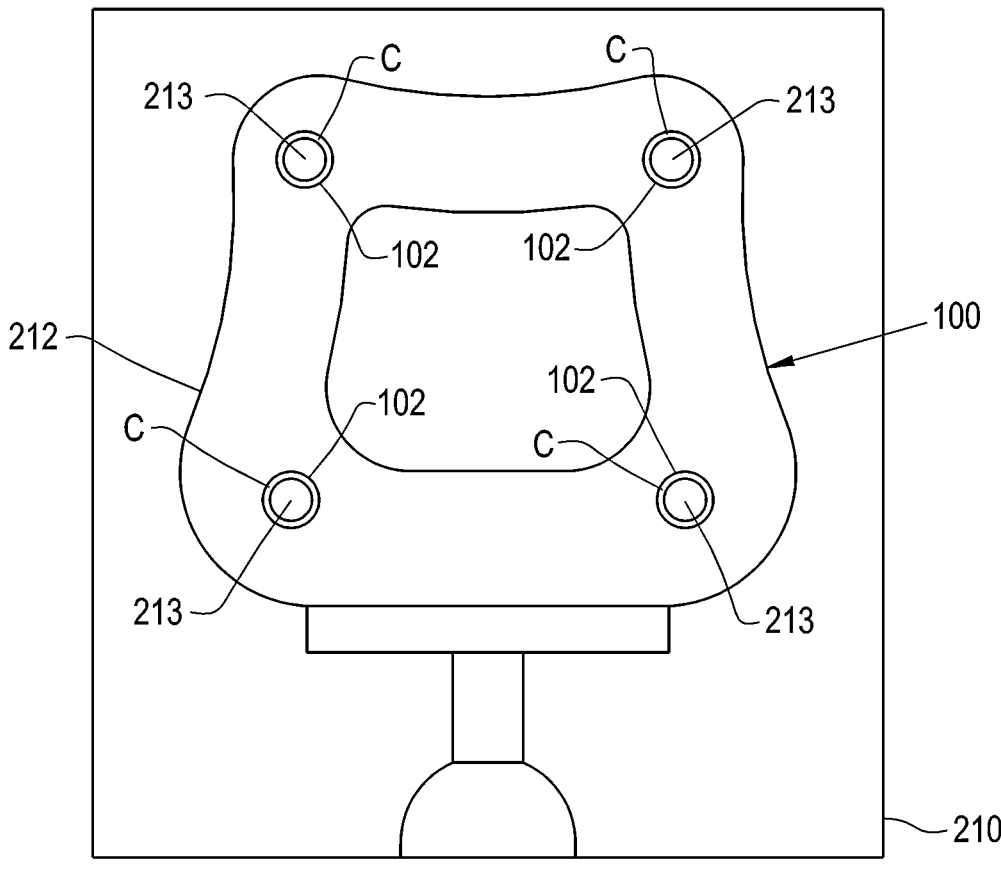
FIG. 2 is a top view of the scaffold of FIG. 1 placed in a mold part cavity of a mold part.

The scaffold 100 is shaped to fit within a mold part 210, illustrated in FIGS. 2-4, to allow molding of material over the scaffold 100. The mold part 210 may be formed as a half that is coupled with another mold part 410, illustrated in FIG. 4, to collectively form a mold 400. Both mold parts 210, 410 may be configured similarly and, in some embodiments, each accept a respective scaffold 100 before injecting molding material. A mold part cavity 211 formed in each of the mold parts 210, 410 may be brought together to form a mold cavity of the mold 400, which will generally correspond to the final shape of the formed implant 500. In some embodiments, the scaffold(s) 100 has the same general shape of the mold part cavity 211 formed in the mold part 210, 410 so the scaffold(s) 100 abuts at least one wall 212 of the mold part cavity 211 when placed in the mold part cavity 211. Molding material is injected into the formed mold cavity during molding to form the orthopaedic implant 500, as is known. The molding material may include, but is not limited to, polymers such as the previously described PAEK, PEKK, PEEK, UHMWPE, and/or PCU and/or metals such as the previously described stainless steel, titanium, and/or cobalt-chrome.

The scaffold 100 includes at least one vent opening 102, illustrated as four vent openings, formed at least partially through the scaffold 100. For example, as illustrated, each vent opening 102 may be formed entirely through opposite surfaces of the scaffold 100 so the vent openings 102 extend completely through the scaffold 100. Each of the vent openings 102 is sized to accept a respective mold insert post 213 placed in the mold part cavity 211 of the mold part 210. The mold insert posts 213 may be placed in the mold part cavity 211 so the scaffold 100 can only be placed in the mold part cavity 211 in the correct orientation, reducing the risk of the scaffold 100 being improperly placed in the mold part cavity 211 prior to injecting molding material. In some embodiments, such as the embodiment illustrated in FIGS. 1-6, the mold insert posts 213 have a post length PL that is less than a corresponding vent opening length OL of the vent openings 102 so the mold insert posts 213 do not fully extend through the scaffold 100.

The mold insert posts 213 and the vent openings 102 are each sized to form a small clearance C (best illustrated in FIG. 2) between each vent opening 102 and its respective mold insert post 213 when the scaffold 100 is placed in the mold part cavity 211. The size of the mold insert posts 213 and the vent openings 102 are chosen so the formed clearances C between the mold insert posts 213 and the vent openings 102 are large enough to allow gas venting through the clearances C but small enough to minimize or prevent molding material to pass through the clearances during molding, e.g., during injection of the molding material. In this respect, the size of the formed clearances C will depend on a variety of considerations, including but not limited to an injection pressure of molding material into the mold 400, a viscosity of the injected molding material, and an injection pressure of gas into the mold 400. As is generally known, a higher pressure and/or a lower viscosity of injected molding material will require smaller clearances C to prevent molding material passing through the formed clearances C during molding, and vice versa. The pressure of the injected gas should also be considered in choosing the size of the formed clearance C so the formed clearances C are not so small that injected gas is not allowed to pass through the vent openings 102 during molding.

To form the orthopaedic implant 500, a scaffold 100 may be placed in each mold part 210, 410 so the mold insert posts 213 extend through the respective vent openings 102 of the scaffolds 100. The mold parts 210, 410 may then be brought together so the mold part cavities 211 of each mold part 210, 410 form the mold cavity of the mold 400. Molding material is injected into the formed mold cavity to fill the mold cavity with molding material. The molding material may be injected into the mold cavity using, for example, a pressurized gas that forces the molding material into the mold cavity and vents through the formed clearances C. The vented gas may also vent out of the mold cavity during molding. The molding material is allowed to cool and/or cure in the mold cavity to harden and form a body 501 of the orthopaedic implant 500, which is bonded to the scaffolds 100. The orthopaedic implant 500 may then be removed from the mold 400 after uncoupling the mold parts 210, 410.

In some embodiments, each of the scaffolds 100 includes a solid barrier layer 510 placed between two portions of porous material 520A, 520B, as best illustrated in FIGS. 5-6. The solid barrier layer 510 may be substantially non-porous, i.e., have a porosity of less than 10%, such as less than 5% or less than 1%, so injected molding material is unable to penetrate through the barrier layer 510. The solid barrier layer 510 may comprise the same material composition as the rest of the scaffold 100 but with a lower porosity or, alternatively, may be a different material. Each vent opening 102 may be formed so a bottom of the vent opening 102 terminates within the barrier layer 510, as illustrated in FIG. 6.

Figure 11:
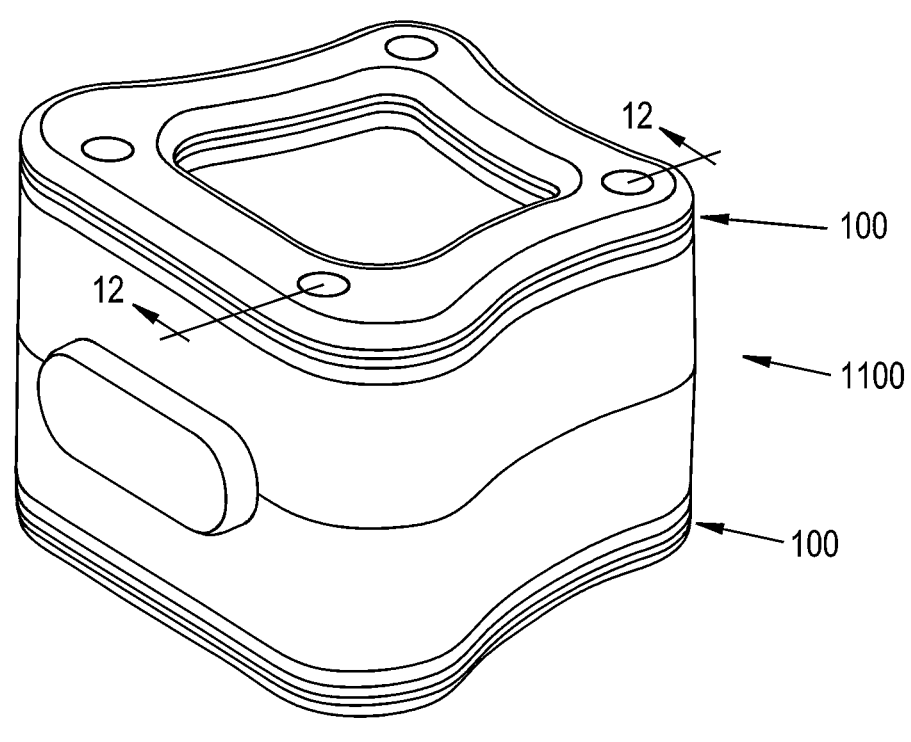
FIG. 11 is a perspective view of an exemplary embodiment of an orthopaedic implant that may be formed using the mold parts of FIG. 10.
Figure 12:
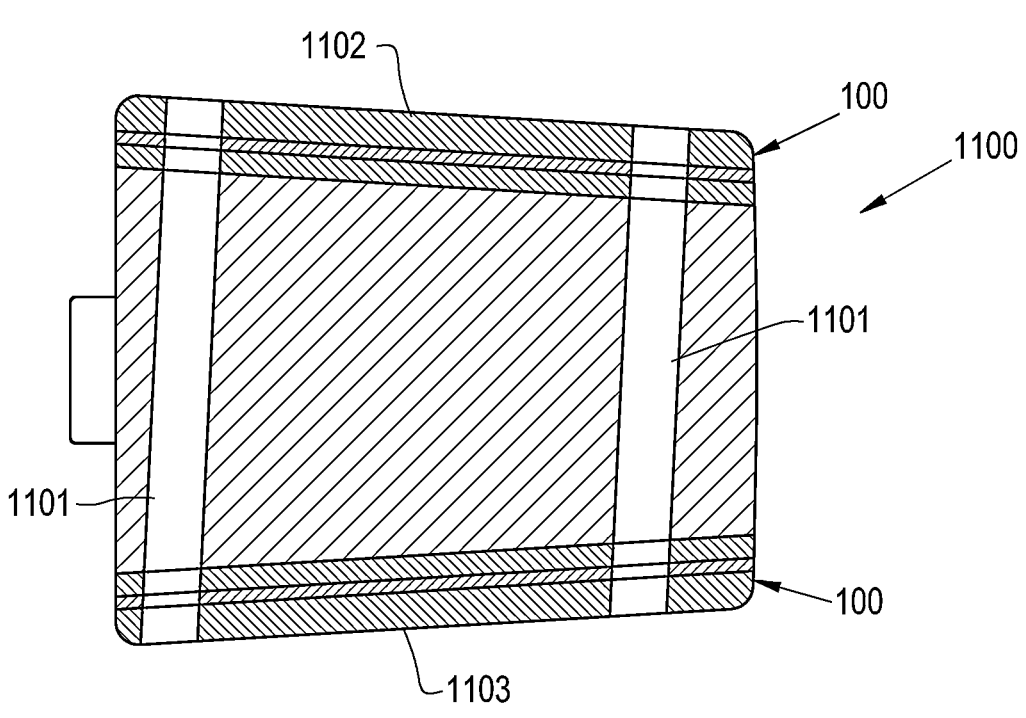
FIG. 12 is a cross-sectional view of the orthopaedic implant of FIG. 11 taken along line 12-12.

Referring now to FIGS. 7-12, another exemplary embodiment of a method of forming an orthopaedic implant 1100 provided according to the present disclosure is illustrated. The method of forming the orthopaedic implant 1100, illustrated in FIGS. 11 and 12, is similar to the method of forming the orthopaedic implant 500 of FIGS. 5-6, with the primary difference being that a mold 1000 used for molding includes a mold part 710 with mold insert posts 713 that are elongated and another mold part 1010 with no mold insert posts. The elongated mold insert posts 713 extend from a bottom surface 714 of a mold part cavity 711 of the respective mold part 710 to a corresponding bottom surface of a mold part cavity of the other mold part 1010 that has no mold insert posts. The elongated mold insert posts 713 extend between opposite surfaces of the mold cavity formed by bringing together the two mold part cavities of the two mold parts 710, 1010, resulting in the orthopaedic implant 1100 being formed with post openings 1101 that extend from a top surface 1102 of the orthopaedic implant 1100 to a bottom surface 1103 of the orthopaedic implant 1100, i.e., the post openings 1101 extend entirely through the orthopaedic implant 1100 as illustrated in FIG. 12. To ensure proper orientation of the scaffold 100 in the mold part 1010 that lacks mold insert posts, the scaffold 100 may be press fit into the respective mold cavity. In other respects, the orthopaedic implant 1100 of FIGS. 11 and 12 may be formed similarly to the orthopaedic implant 500 of FIGS. 5 and 6, so further description is omitted for brevity.

Figure 13:
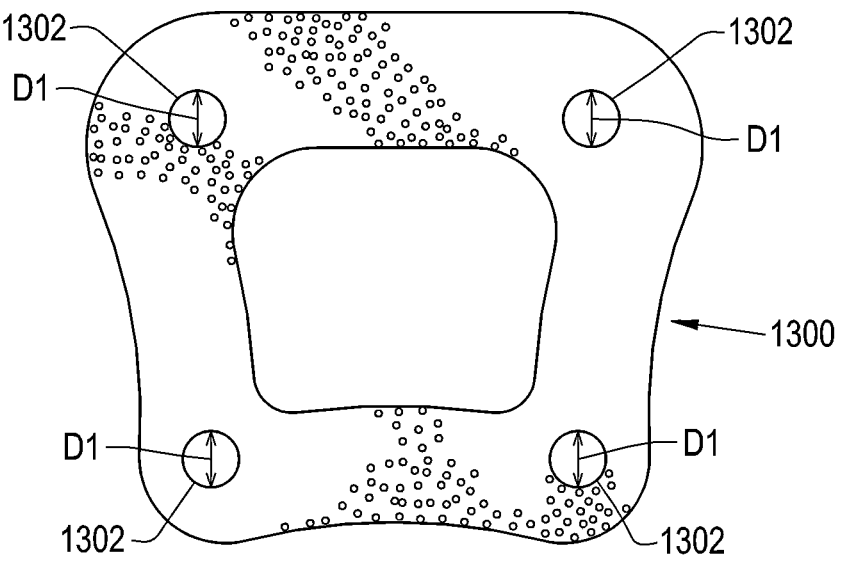
FIG. 13 is a top view of an exemplary embodiment of a first scaffold that may be used to form an orthopaedic implant according to the present invention.
Figure 14:
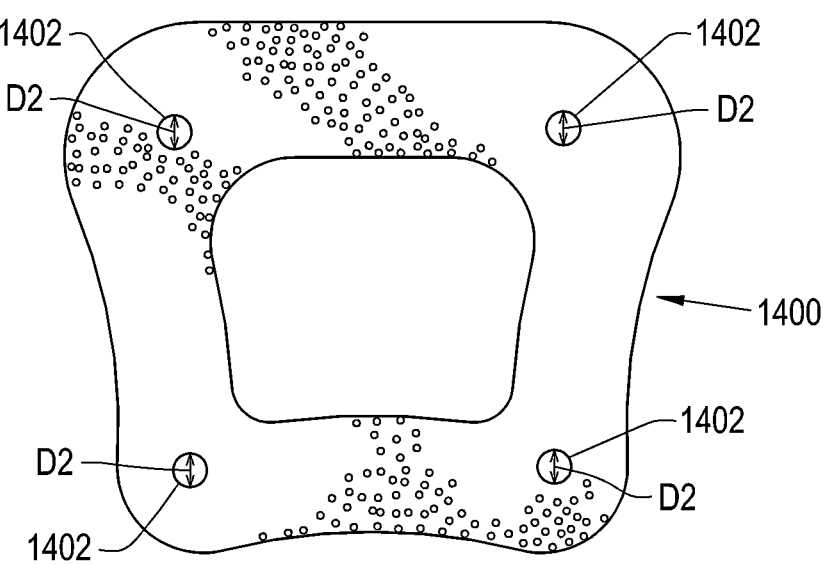
FIG. 14 is a top view of an exemplary embodiment of a second scaffold that may be used in conjunction with the first scaffold of FIG. 13 to form an orthopaedic implant according to the present invention.
Figure 15:
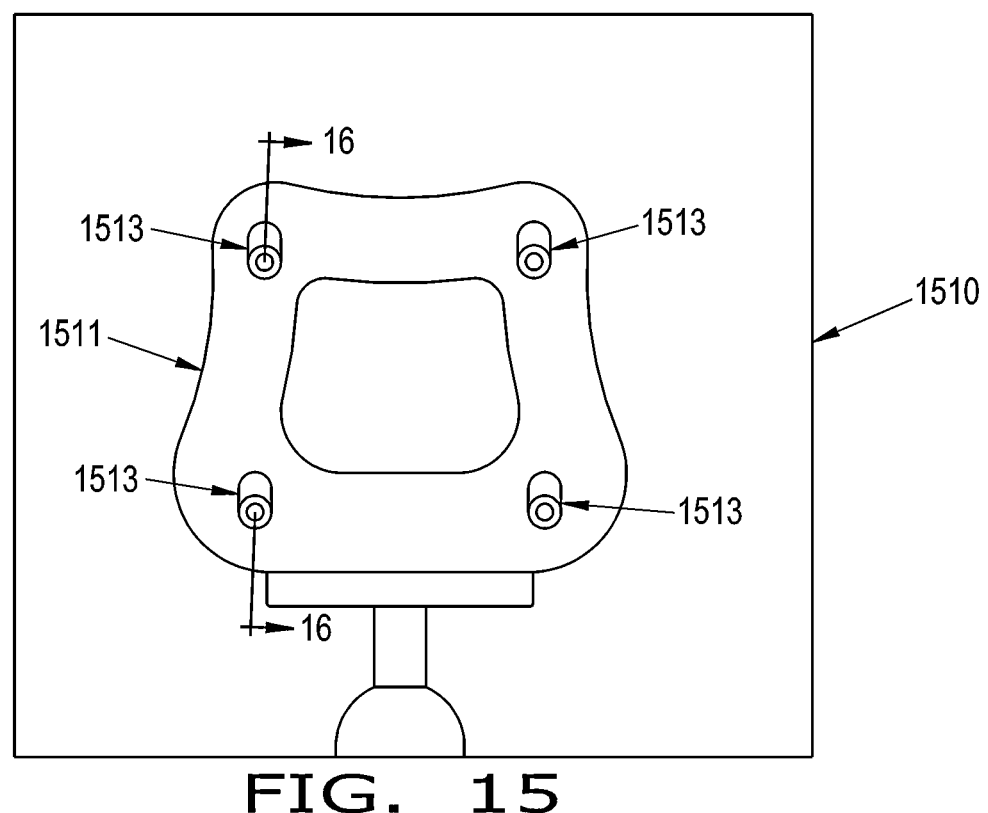
FIG. 15 is an exemplary embodiment of a mold part that may be used to form an orthopaedic implant according to the present invention.
Figure 16:
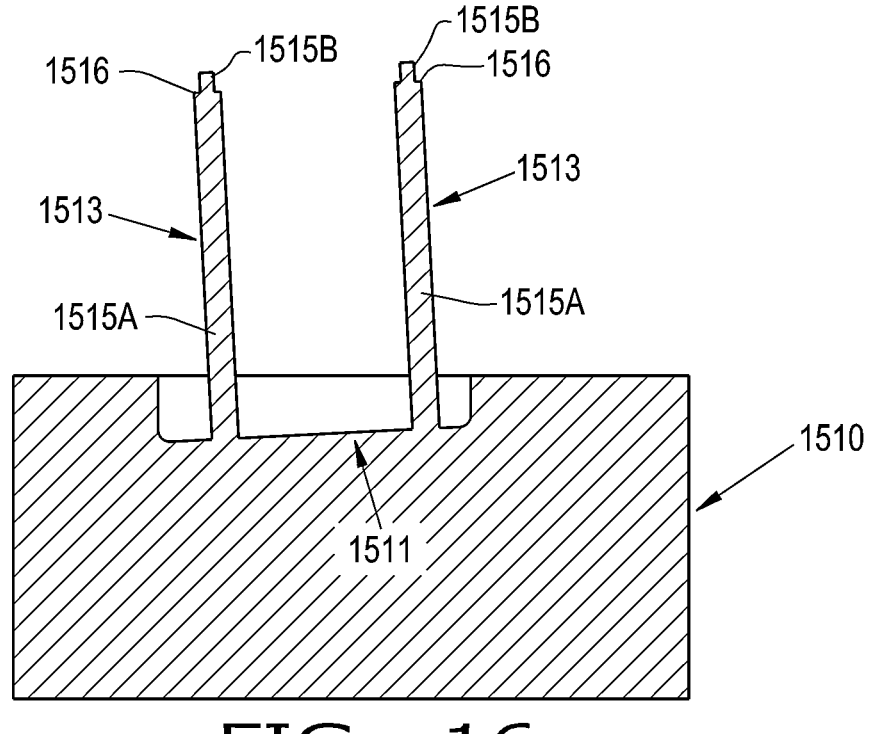
FIG. 16 is a cross-sectional view of the mold part of FIG. 15 taken along line 16-16.
Figure 17:
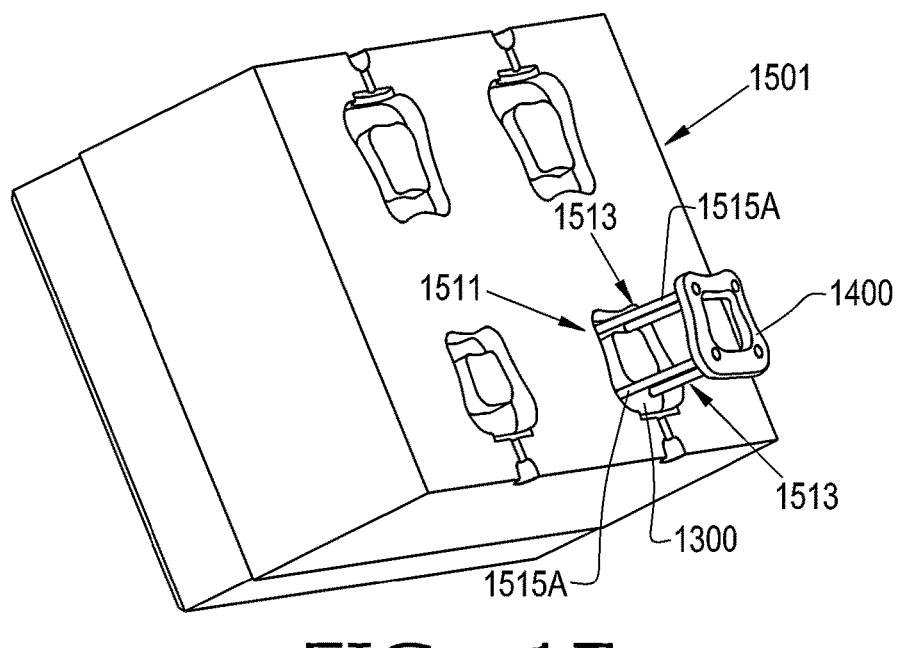
FIG. 17 is a perspective view of the first scaffold of FIG. 13 placed on an elongated mold insert post in a mold cavity of the mold part of FIGS. 15-16 and the second scaffold of FIG. 14 being placed on the elongated mold insert post.
Figure 18:
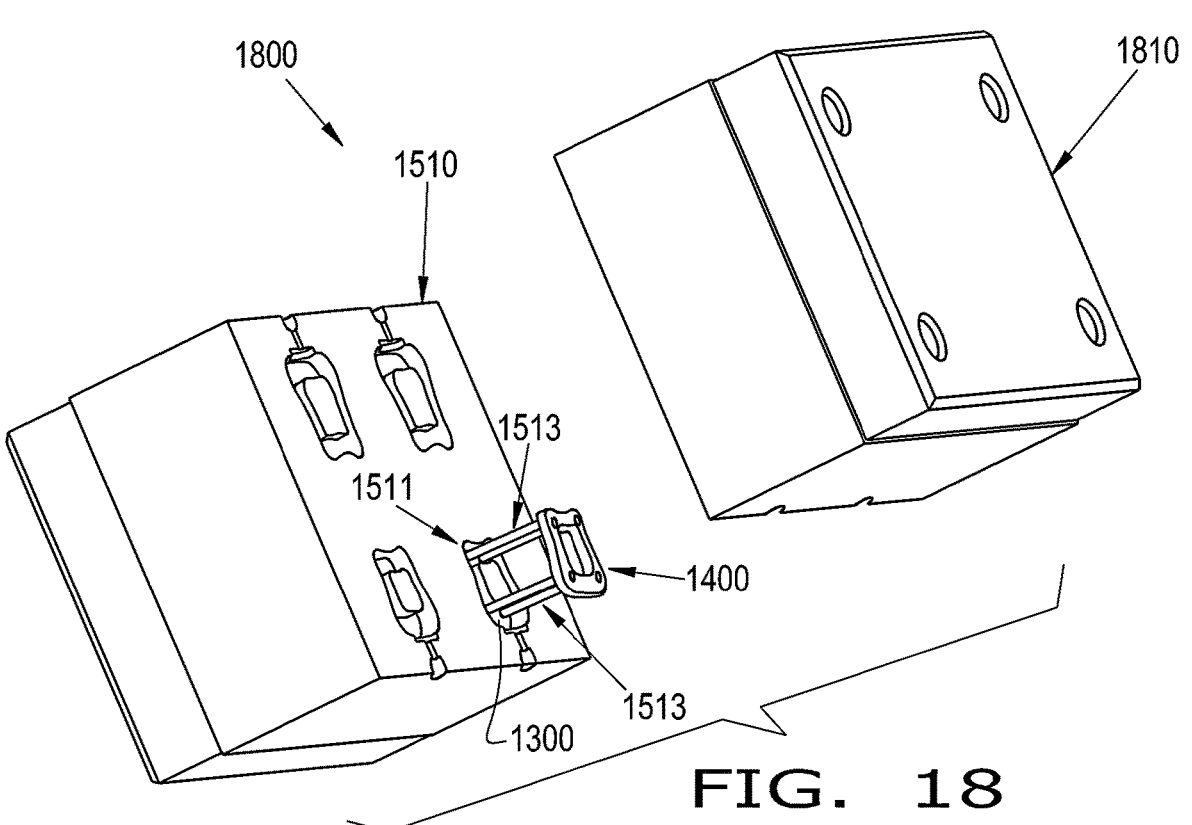
FIG. 18 is a perspective view of another mold part being brought toward the mold part of FIGS. 15 and 17 after the first scaffold and the second scaffold have been placed as illustrated in FIG. 17.

Referring now to FIGS. 13-18, another exemplary embodiment of a method of forming an orthopaedic implant provided according to the present disclosure is illustrated. As illustrated in FIGS. 13-14, the orthopaedic implant may include a first scaffold 1300 (illustrated alone in FIG. 13) and a second scaffold 1400 (illustrated alone in FIG. 14), with each of the scaffolds 1300, 1400 including a plurality of respective vent openings 1302, 1402. As can be appreciated from comparing FIGS. 13 and 14, the first scaffold 1300 may have first vent openings 1402 each defining a first diameter D1 and the second scaffold 1400 may have second vent openings 1402 each defining a second diameter D2 that is less than the first diameter D1. In other respects, the scaffolds 1300, 1400 may be similarly formed. The first scaffold 1300 may be placed in a first mold cavity 1511 of a first mold part 1510, as illustrated in FIGS. 15 and 16, which has a plurality of elongated mold insert posts 1513 that each include a first post portion 1515A defining a first post diameter and a second post portion 1515B defining a second post diameter that is smaller than the first post diameter. The first post portion 1515A and the second post portion 1515B may meet at a shoulder 1516 formed in the mold insert posts 1513. The first scaffold 1300 may be placed in the first mold cavity 1511 so part of the first post portion 1515A of each mold insert post 1513 is placed within each of the first vent openings 1302. Similarly, the second scaffold 1400 may be placed onto the second post portion 1515B so part of the second post portion 1515B of each mold insert post 1513 is placed within each of the second vent openings 1402 and the second scaffold 1400 rests on the shoulder 1516. Each vent opening 1302, 1402 and its respective post portion 1515A, 1515B may define a clearance therebetween that allows gas venting but prevents most, if not all, molding material passing through during molding, as previously described. Placing the second scaffold 1400 on the second post portions 1515B so the second scaffold 1400 rests on the shoulder 1516 can make it easier to load and properly hold the second scaffold 1400 in the mold before injecting molding material. After placing the scaffolds 1300, 1400 on the mold insert posts 1513, a second mold part 1810 can be brought together with the first mold part 1510 to form a mold 1800 with a mold cavity. Molding material is then injected into the formed mold cavity and allowed to harden to form the orthopaedic implant.

Figure 19:
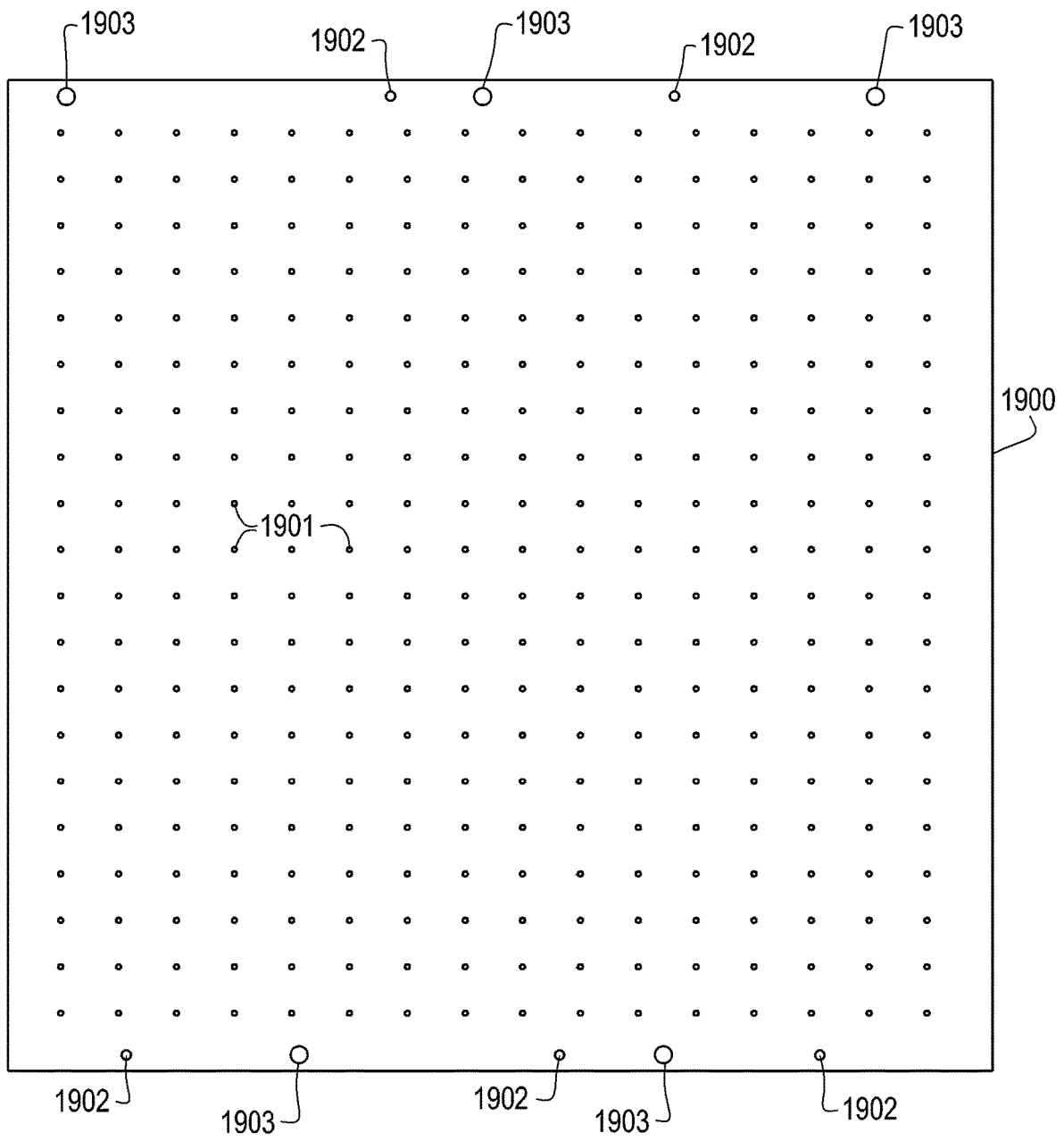
FIG. 19 is a top view of an exemplary embodiment of a barrier layer provided according to the present invention that may be used to form an orthopaedic implant.
Figure 20:
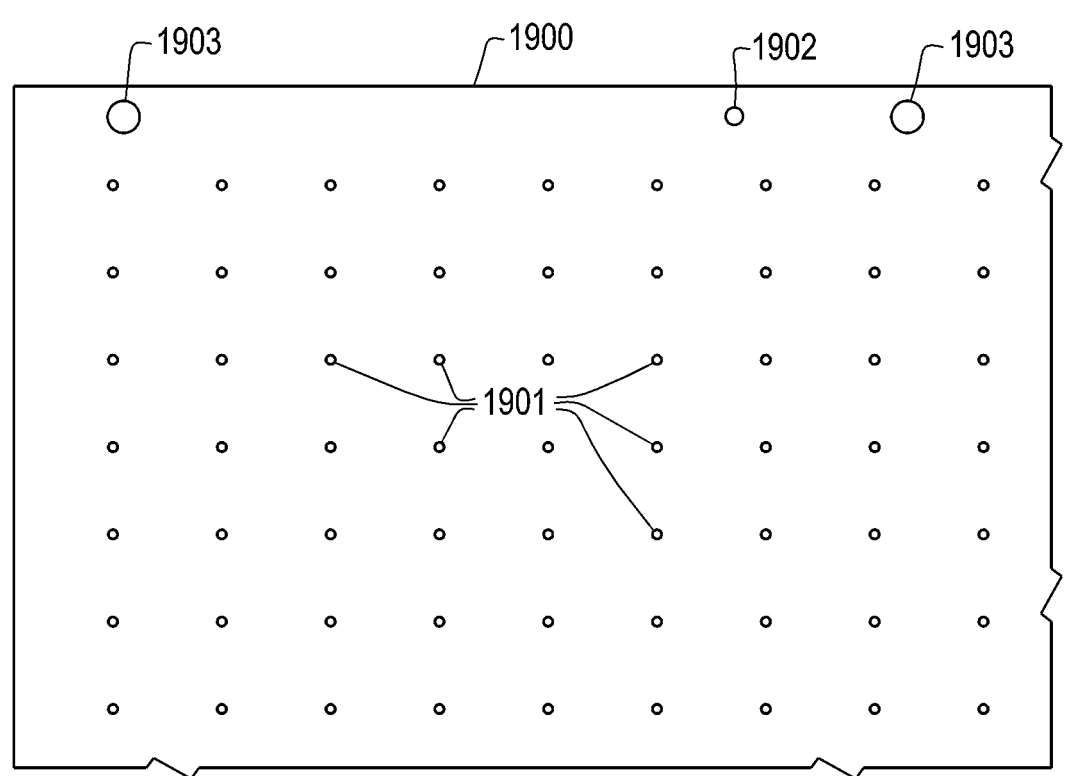
FIG. 20 is a close-up view of a portion of the barrier layer of FIG. 19.
Figure 21:
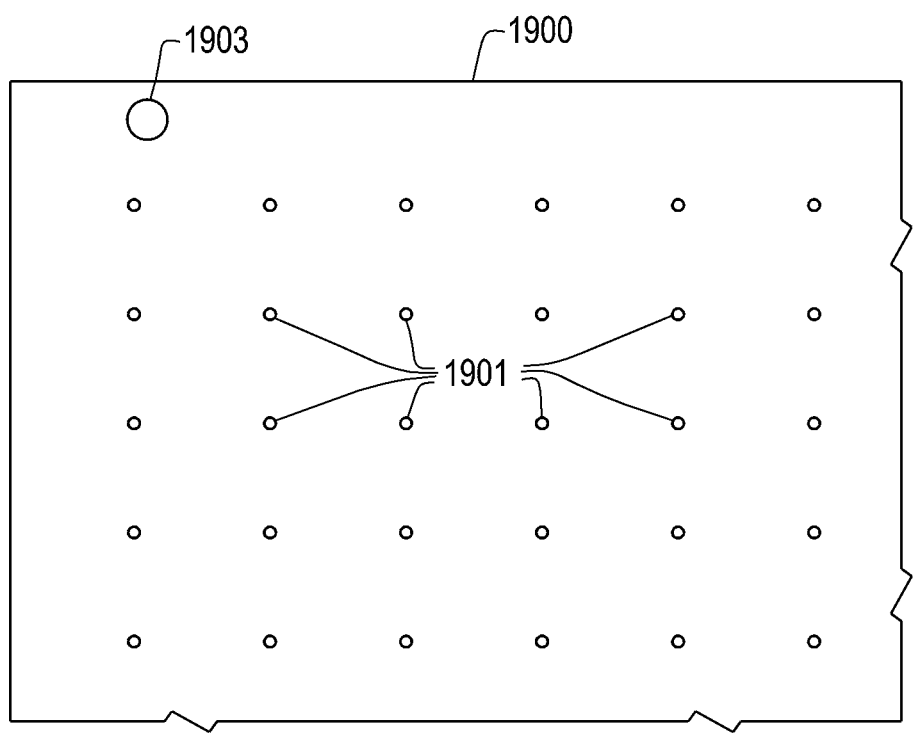
FIG. 21 is another close-up view of a portion of the barrier layer of FIGS. 19-20.
Figure 22:
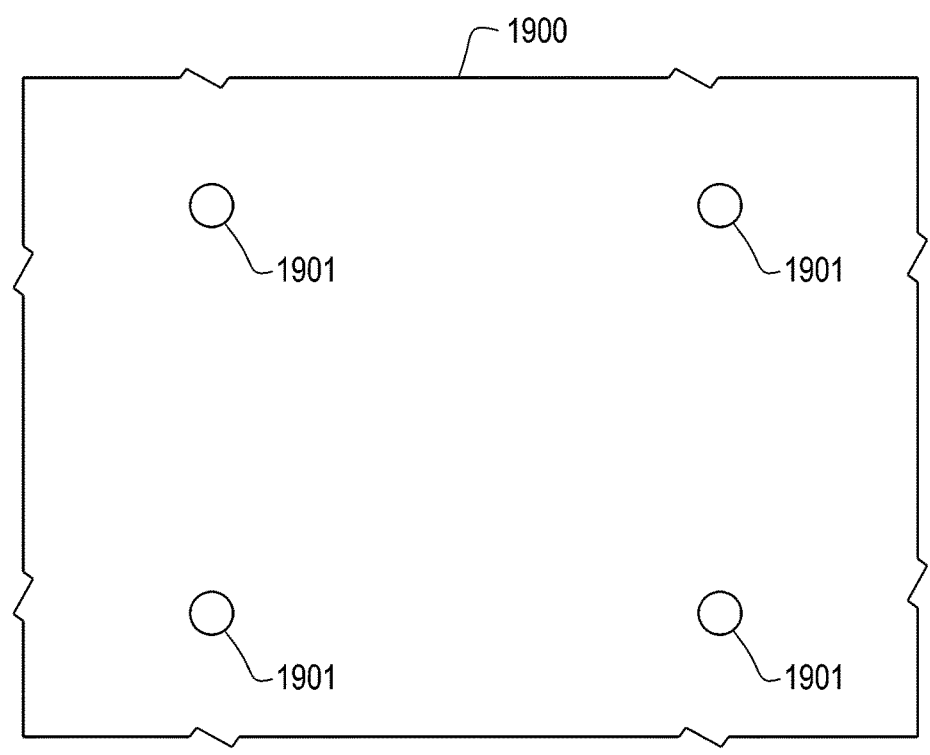
FIG. 22 is yet another close-up view of a portion of the barrier layer of FIGS. 19-21.
Figure 23:
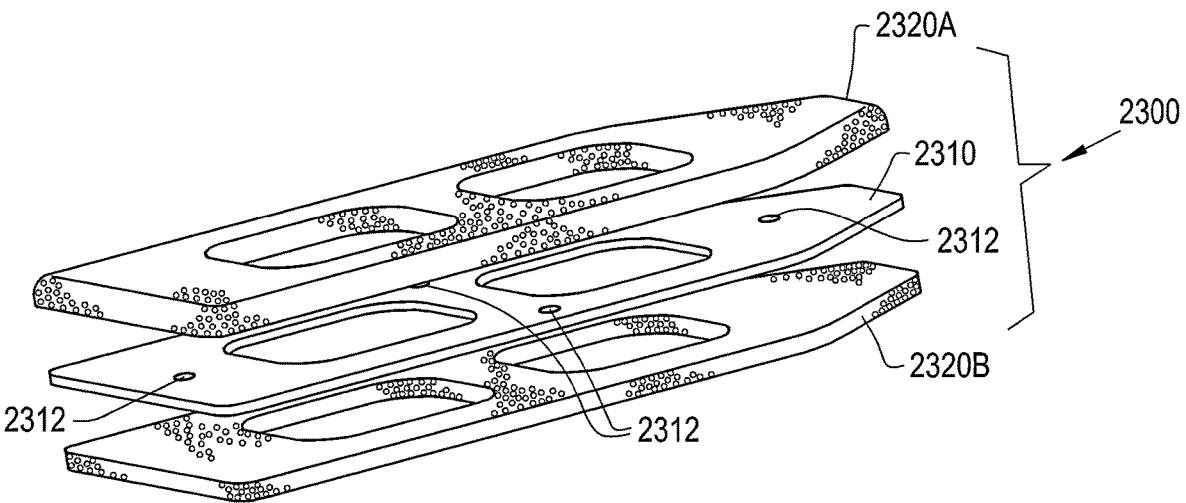
FIG. 23 is an exploded view of an exemplary embodiment of a scaffold provided according to the present invention that includes a barrier layer sandwiched between two portions of biocompatible material.
Figure 24:
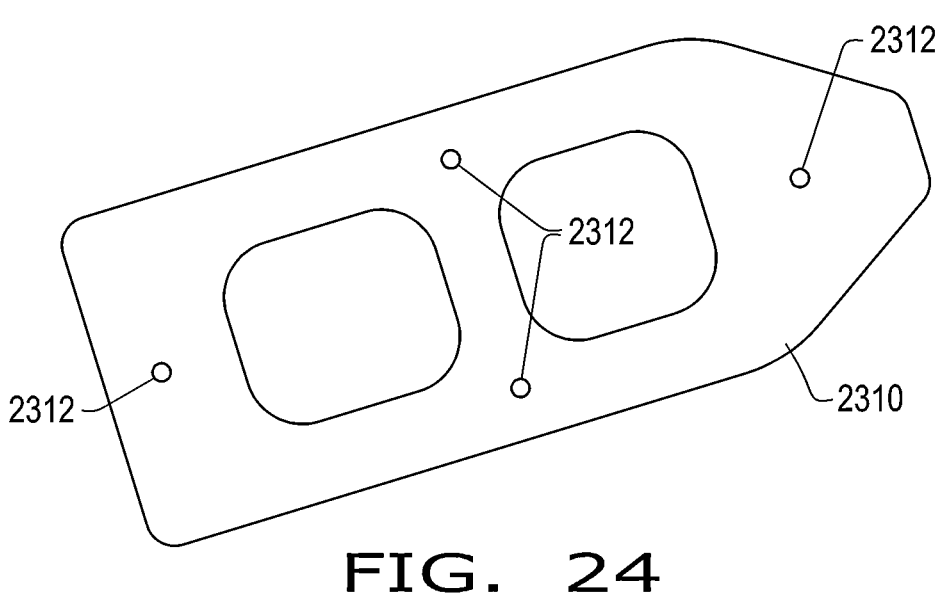
FIG. 24 is a top view of the barrier layer of the scaffold of FIG. 23.
Figure 25:
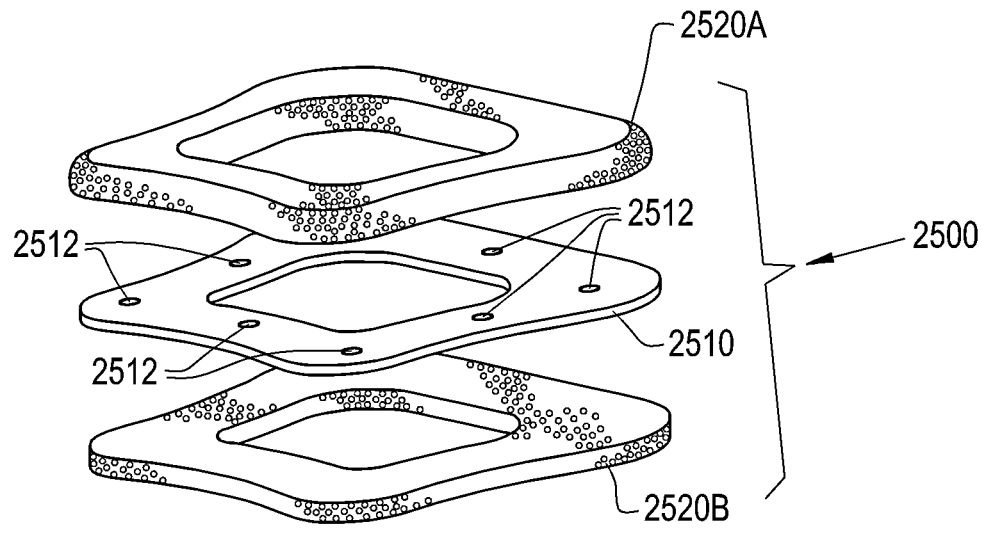
FIG. 25 is an exploded view of an exemplary embodiment of a scaffold provided according to the present invention that includes a barrier layer sandwiched between two portions of biocompatible material.
Figure 26:
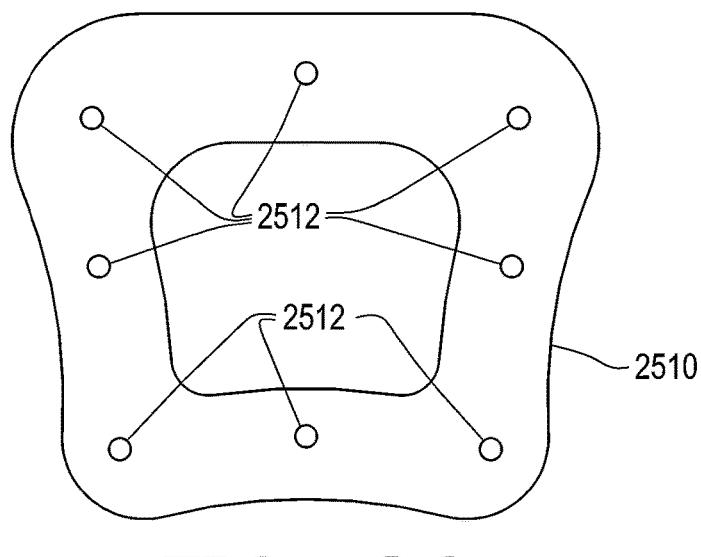
FIG. 26 is a top view of the barrier layer of the scaffold of FIG. 25.
Figure 27:
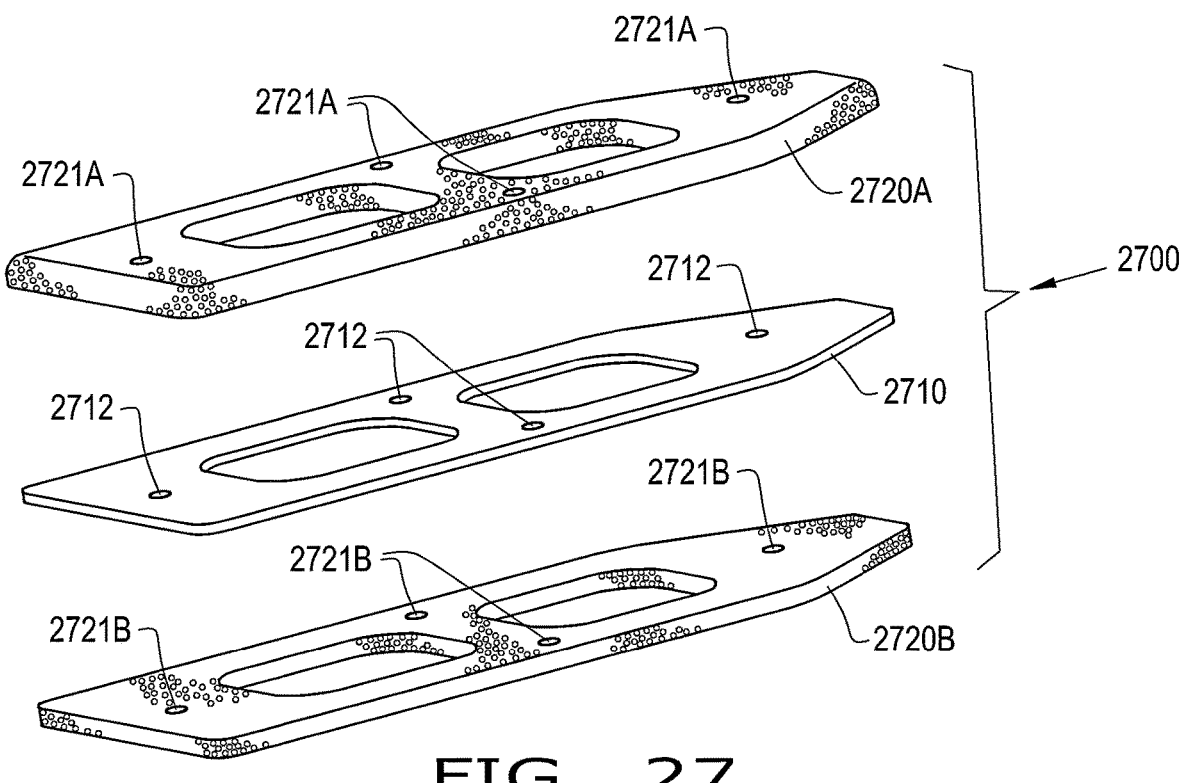
FIG. 27 is an exploded view of an exemplary embodiment of a scaffold provided according to the present invention that includes a barrier layer sandwiched between two portions of biocompatible material.
Figure 28:
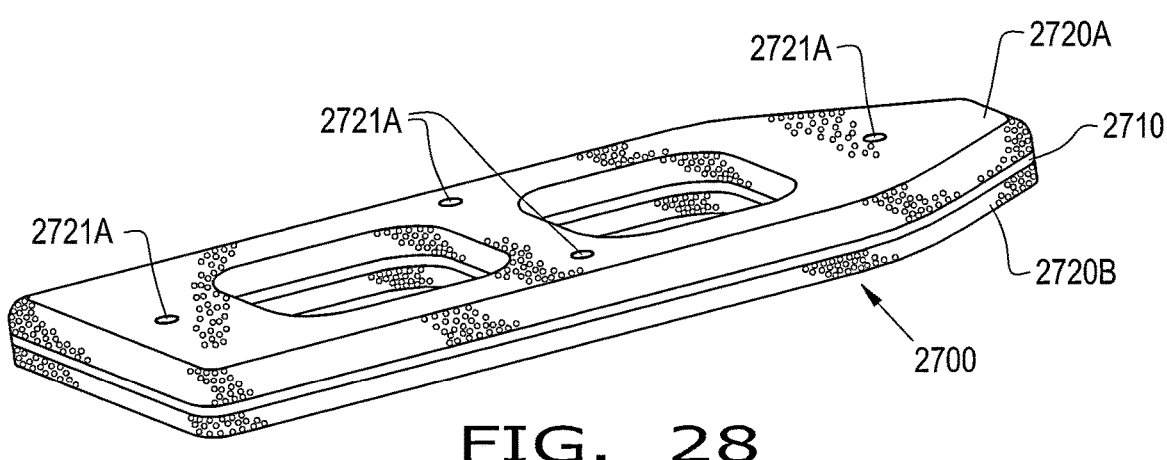
FIG. 28 is a perspective view of the scaffold of FIG. 27.

In some embodiments, and referring now to FIGS. 19-22, the vent openings are formed in a barrier layer that is disposed between two portions of biocompatible material to form a scaffold. The biocompatible material of the scaffold may have interconnected pores while the barrier layer is a solid sheet that has openings of various sizes formed therein. As illustrated in FIG. 19, which is a view of an entire sheet 1900 forming a barrier layer, the sheet 1900 may include a plurality of pores 1901 each having a pore diameter, a plurality of intermediate openings 1902 having an intermediate diameter greater than the pore diameter(s), and a plurality of vent openings 1903 that are sized to allow gas to vent therethrough while minimizing injected molding material from passing through during molding. The openings 1901, 1902, 1903 may range in diameter from, for example, 0.0005 inches to 0.040 inches, depending on several variables, with an exemplary range of diameters being 0.0005 inches for the pores 1901 up to 0.025 inches for the vent openings 1903. In some embodiments, the sheet 1900 forming the barrier layer has differing numbers of each type of openings 1901, 1902, 1903. The sheet 1900 may include, for example, at least 200 pores, such as at least 500 pores, at least 1,000 pores, or at least 1,500 pores, arranged in a regular grid on the sheet 1900. The sheet 1900 may include a smaller number of intermediate openings 1902 and vent openings 1903, such as between 1 and 10 of each. As can be seen, the pores 1901 may all have the same diameter, the intermediate openings 1902 may all have the same diameter, and the vent openings 1903 may all have the same diameter. It should be appreciated that the number, placement, and size of the openings 1901, 1902, 1903 can be adjusted to allow venting of gases through the vent openings 1903 while also minimizing molding material passing through the openings 1901, 1902, 1903 and allowing cell and tissue ingrowth through the barrier layer 1900.

While FIGS. 19-22 illustrate a barrier layer formed as a sheet 1900 having pores 1901 and openings 1902, 1903 of different sizes, the shape and size of the barrier layer, as well as the arrangement of openings in the barrier layer, may be altered. Referring now to FIGS. 23-28, exemplary embodiments of scaffolds 2300, 2500, 2700 incorporating barrier layers 2310, 2510, 2710 are illustrated. As can be appreciated from FIGS. 23-28, the barrier layers 2310, 2510, 2710 are each sandwiched between two portions 2320A, 2320B, 2520A, 2520B, 2720A, 2720B of biocompatible material of the scaffolds 2300, 2500, 2700. Each of the barrier layers 2310, 2510, 2710 may have a shape that is similar to the sandwiching portions 2320A, 2320B, 2520A, 2520B, 2720A, 2720B and include one or more vent openings 2312, 2512, 2712 formed therein that allow gas to vent therethrough while minimizing or preventing molding material passing through the vent openings 2312, 2512, 2712 during molding. It should be appreciated from the exemplary embodiments that the number and arrangement of the vent openings 2312, 2512, 2712 in the barrier layer 2310, 2510, 2710 can be adjusted in a variety of ways to provide different gas venting behavior through the barrier layers 2310, 2510, 2710 during molding. In some embodiments, such as the embodiment illustrated in FIGS. 27 and 28, the portions 2720A, 2720B of the scaffold 2700 sandwiching the barrier layer 2710 therebetween may include scaffold vent openings 2721A, 2721B that align with the vent openings 2712 of the barrier layer 2710 to vent gas during molding.

Figure 29:
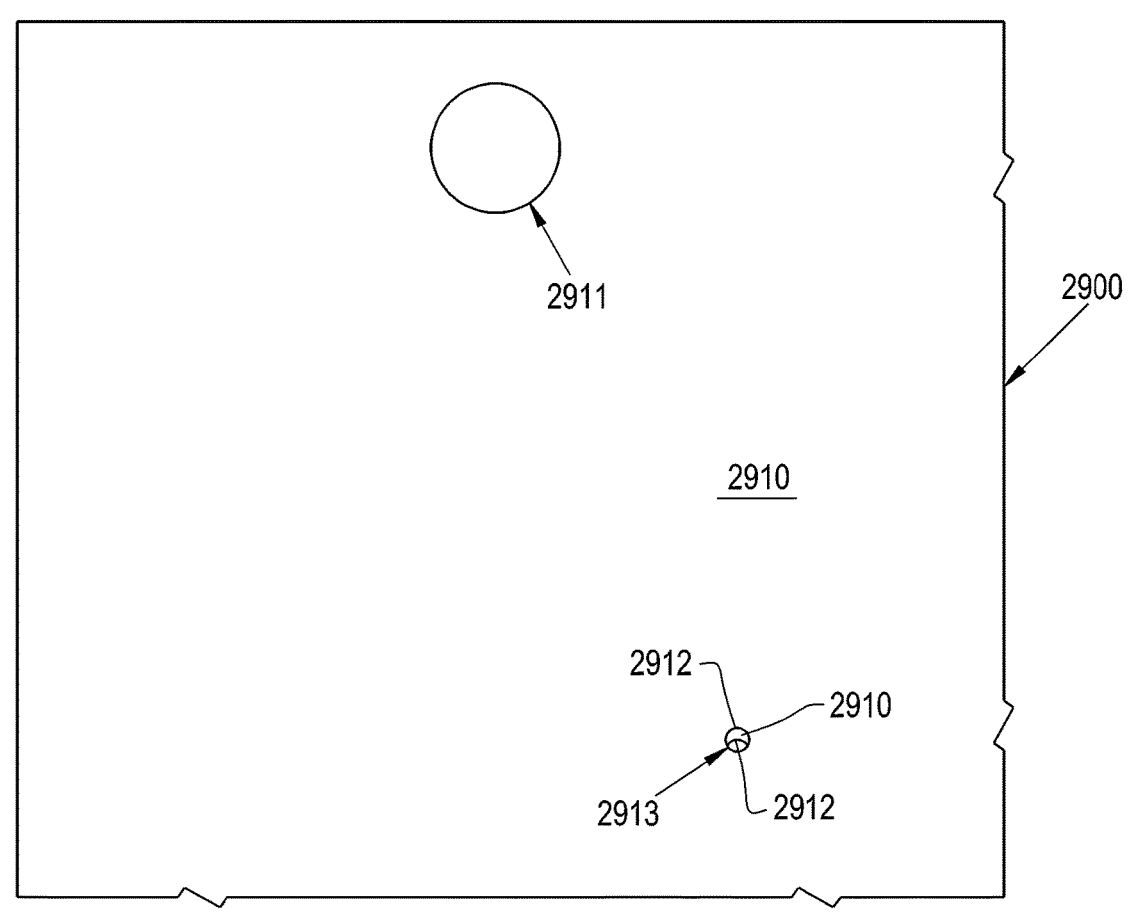
FIG. 29 is a close-up view of an exemplary embodiment of a barrier portion provided according to the present invention that includes a plurality of barrier layers.
Figure 30:
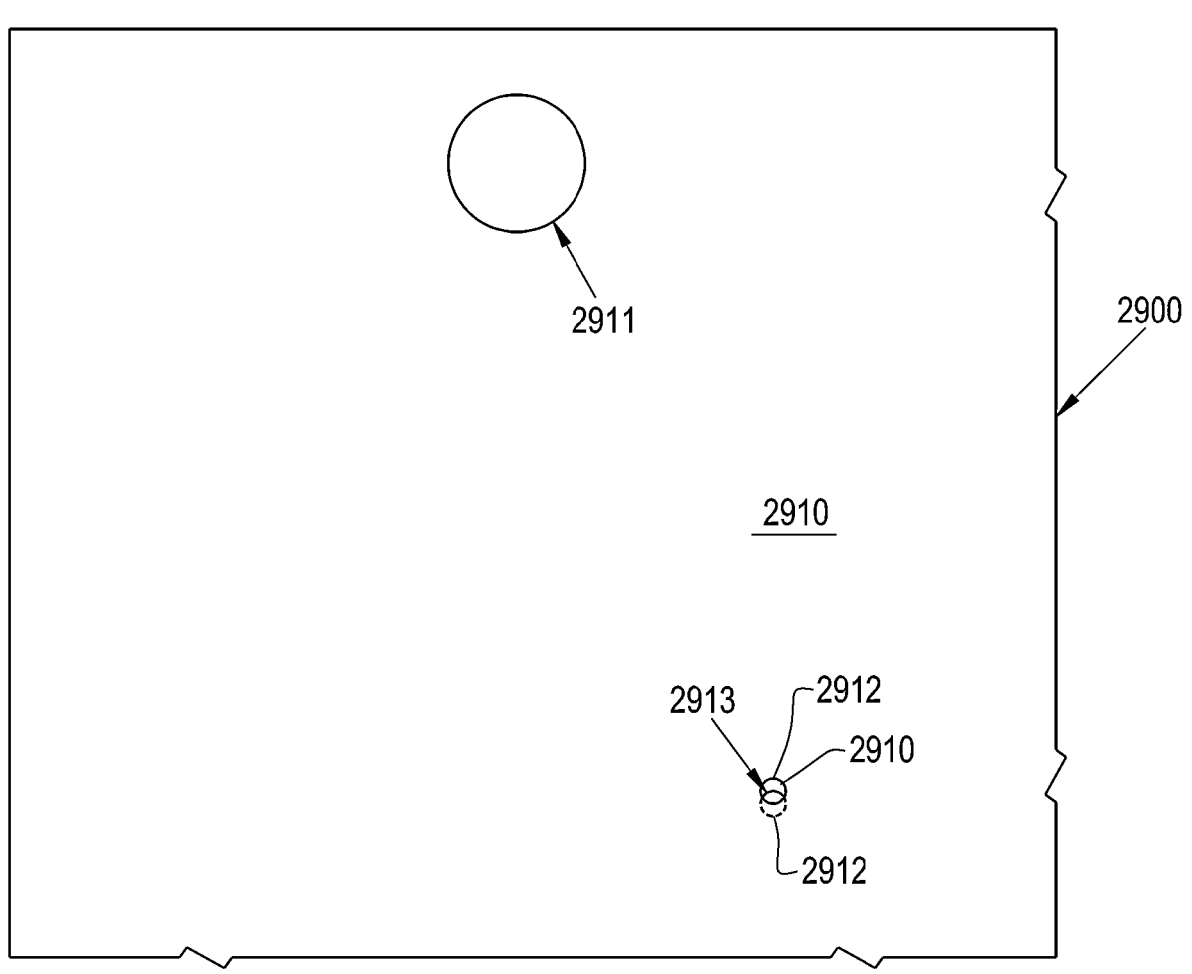
FIG. 30 is a close-up view of an exemplary embodiment of a barrier portion provided according to the present invention that includes a plurality of barrier layers.
Figure 31:
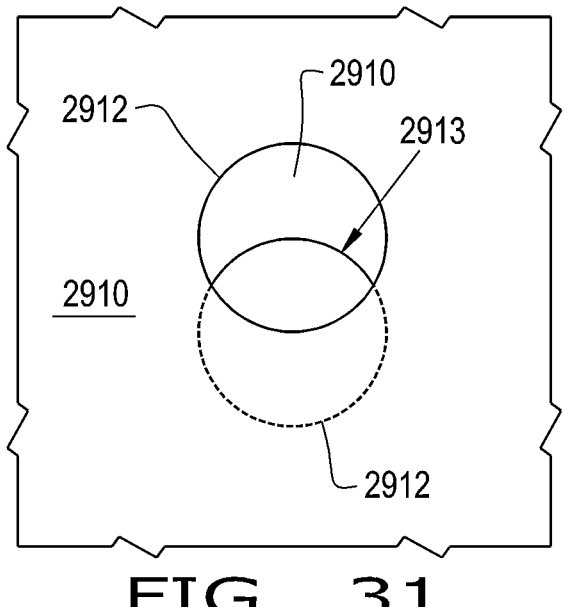
FIG. 31 is another close-up view of the barrier portion of FIG. 30 illustrating partial overlapping of an opening formed between two barrier layers.

In some embodiments, and referring now to FIGS. 29-31, a scaffold is provided that includes a barrier portion 2900 comprising a plurality of barrier layers 2910 that are stacked on top of each other. The barrier layers 2910 may each have one or more fully overlapped openings 2911 to form a through-opening that extends through the barrier portion 2900, shown as the larger opening in FIGS. 29-31. In addition, or alternatively, each of the barrier layers 2911 may have one or more openings 2912 that are offset with respect to one or more corresponding openings 2912 of the other barrier layer(s) 2910 to form one or more partially overlapped openings 2913, which is best illustrated in FIG. 31. By offsetting the openings 2912, different geometries and sizes of vent openings may be created in situations where manufacturing capabilities or constraints make it difficult to form singular vent openings due to, e.g., size or tolerance of the vent opening(s). By partially overlapping openings, relatively small and/or irregularly shaped overlapped openings can be formed from two larger and/or differently shaped openings, which can be more easily manufactured, to reduce manufacturing difficulty and/or cost. Thus, it should be appreciated that the barrier layer(s) 2910 forming the barrier portion 2900 of the scaffold can have different opening arrangements to alter the gas venting behavior of the barrier portion during molding.

Figure 32:
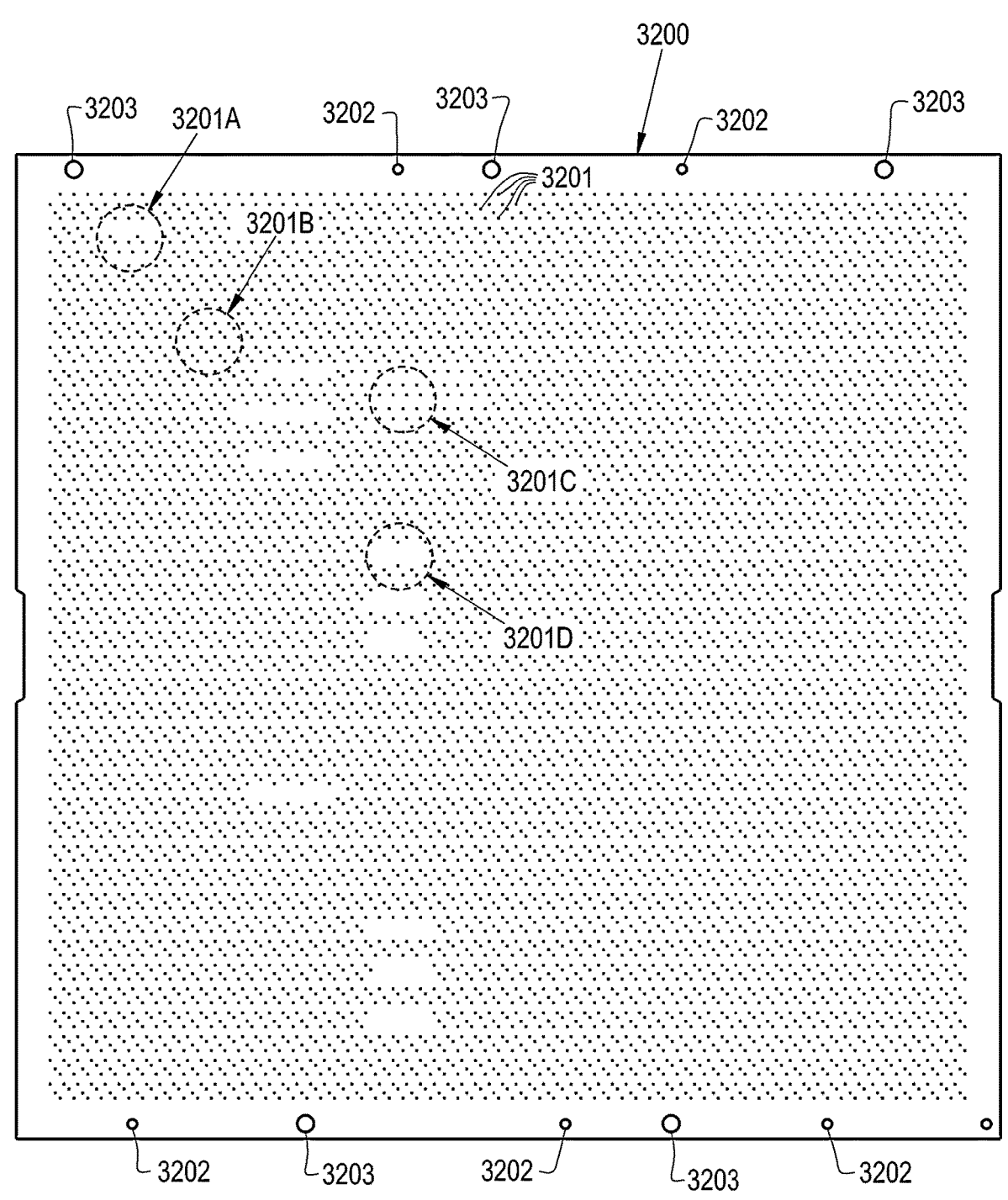
FIG. 32 is a top view of another exemplary embodiment of a barrier layer provided according to the present invention that has regions of openings with differing concentrations per unit area of openings.

Referring now to FIG. 32, another exemplary embodiment of a barrier layer in the form of a sheet 3200 that may be used in a scaffold is illustrated. As can be seen, the sheet 3200 has a plurality of openings 3201, 3202, 3203 of various sizes, with the openings 3201 being smaller than the openings 3202, which are smaller than the openings 3203, which may be vent openings. The openings 3201, which may be referred to as pores, may be distributed in the sheet 3200 to form different regions 3204A, 3204B, 3204C, 3204D of openings 3201 that have different concentrations per unit area of openings 3201. For example, the region 3204A may be a first region of openings 3201 with a first concentration per unit area of the openings 3201 and the region 3204B may be a second region of openings 3201 with a second concentration per unit area of the openings 3201 that is greater than the first concentration per unit area of the openings 3201. In this respect, for a same unit area, illustrated as dashed-line circles, there are more openings 3201 in the second region 3204B than in the first region 3204A. The openings 3201 may be regularly arranged in a defined pattern in one or more of the regions 3204A, 3204B, 3204C, 3204D or, alternatively, may be randomly arranged in one or more of the regions 3204A, 3204B, 3204C, 3204D. In some embodiments, the openings 3201 are regularly arranged in a defined pattern in all of the regions 3204A, 3204B, 3204C, 3204D and, in some embodiments, the openings 3201 are randomly arranged in all of the regions 3204A, 3204B, 3204C, 3204D. In some embodiments, the openings 3201 are arranged in the sheet 3200 to align with pores of one or more portion of a scaffold sandwiching the sheet 3200 therebetween. It should thus be appreciated that the openings 3201, 3202, 3203 of the sheet 3200, such as the openings 3201, can be arranged in a variety of different ways.

Figure 33:
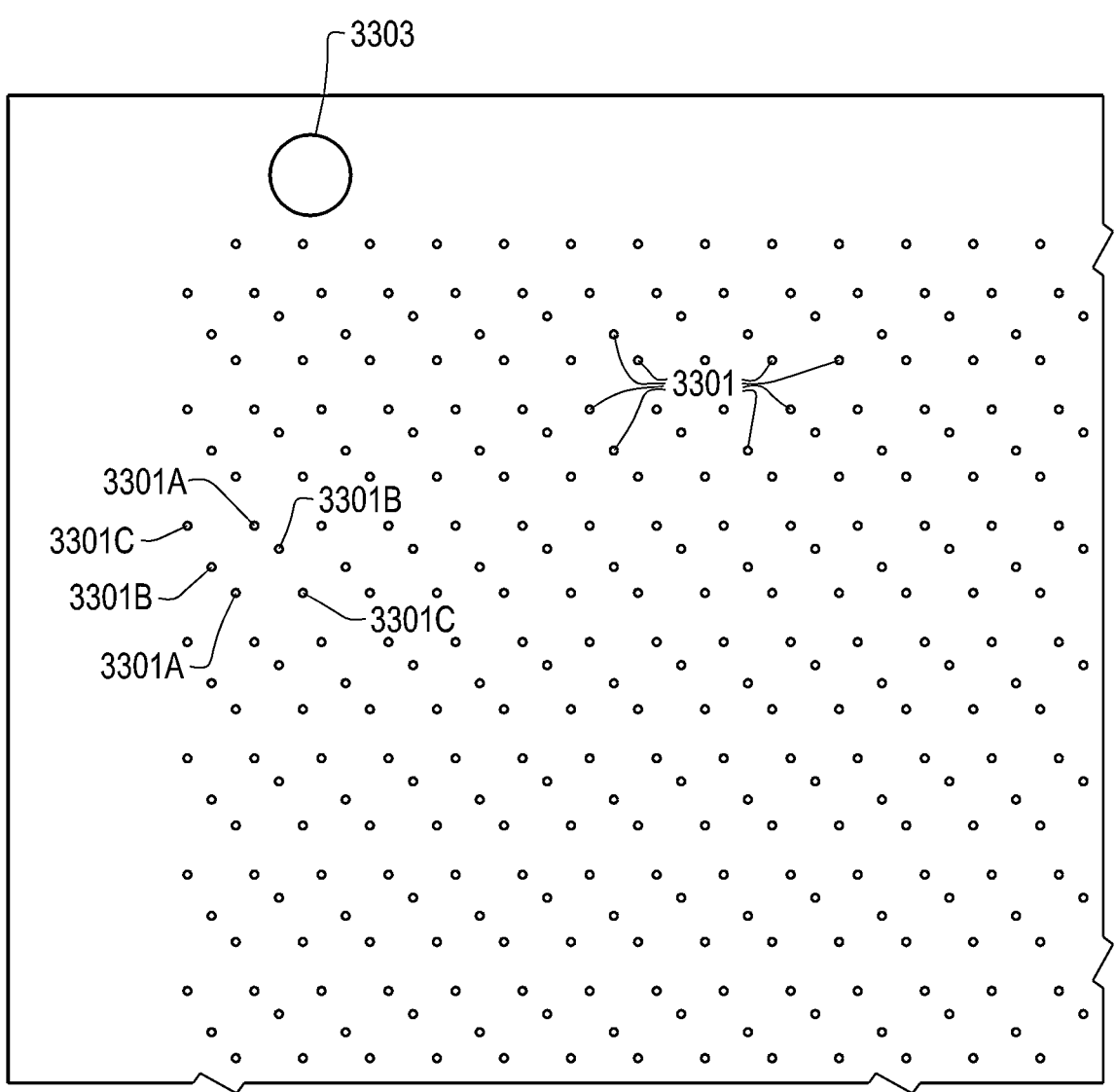
FIG. 33 is a close-up view of another exemplary embodiment of a barrier layer provided according to the present invention.

Referring now to FIG. 33, yet another exemplary embodiment of a barrier layer provided in the form of a sheet 3300 is illustrated. The sheet 3300 may include a plurality of openings 3301, which may be in the form of relatively small pores, and one or more vent openings 3203. As illustrated, the openings 3301 may be arranged in a generally regular pattern through the sheet 3300, e.g., in horizontal rows as a repeating pattern of alternating diagonal triplets with a first opening 3301A that is closer to a second opening 3301B than a third opening 3301C. In other respects, the sheet 3300 can be similar to previously described sheets.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of forming an implant, the method comprising:

placing a porous scaffold having a plurality of pores formed therein in a mold part cavity of a mold cavity of a mold, the porous scaffold comprising two portions of biocompatible material and a barrier layer disposed between the two portions, the barrier layer comprising a solid sheet comprising a plurality of vent openings that are sized to allow gas to vent therethrough; and injecting molding material into the mold cavity to fill some of the pores of the porous scaffold in the mold cavity and form the implant, wherein at least some of the gas in the mold cavity vents through the vent openings during the injecting.

2. The method of claim 1, wherein the two portions of biocompatible material each comprise a plurality of interconnected pores.

3. The method of claim 1, wherein the barrier layer comprises a plurality of first openings and a plurality of second openings, the first openings all having a same diameter and the second openings all having a same diameter.

4. The method of claim 3, wherein the diameter of each of the second openings is greater than the diameter of each of the first openings and less than a diameter of each of the vent openings.

5. The method of claim 3, wherein the first openings are arranged in a regular grid.

6. The method of claim 1, wherein the two portions of biocompatible material comprise a first sandwiching portion and a second sandwiching portion, the barrier layer being sandwiched between the first sandwiching portion and the second sandwiching portion.

7. The method of claim 6, wherein the first sandwiching portion comprises at least one scaffold vent opening and the second sandwiching portion comprises at least one scaffold vent opening, the at least one scaffold vent opening of the first sandwiching portion and the at least one scaffold vent opening of the second sandwiching portion aligning with one of the vent openings of the barrier layer.

8. The method of claim 1, wherein the scaffold comprises a barrier portion comprising the barrier layer and at least one other barrier layer stacked on top of the barrier layer, the at least one other barrier layer having an opening that at least partially overlaps with at least one opening of the barrier layer to form an at least partially overlapped opening.

9. The method of claim 8, wherein the at least partially overlapped opening is a fully overlapped opening forming a through-opening that extends through the barrier portion.

10. The method of claim 8, wherein the at least one opening of the at least one other barrier layer has a same shape and size as the at least one opening of the barrier layer.

11. The method of claim 8, wherein the at least one opening of the at least one other barrier layer is offset relative to the at least one opening of the barrier layer.

12. The method of claim 1, wherein the barrier layer comprises a plurality of first openings having a first size, the first openings being distributed in a first region at a first concentration per unit area and a second region at a second concentration per unit area that is greater than the first concentration per unit area.

13. The method of claim 12, wherein the first openings are regularly arranged in a defined pattern in the first region and/or in the second region.

* * * * *